May 31, 1960 W. A. RILEY ET AL 2,938,485
POWER TRANSMISSION APPARATUS FOR TORPEDOES
Filed March 31, 1945 7 Sheets-Sheet 1
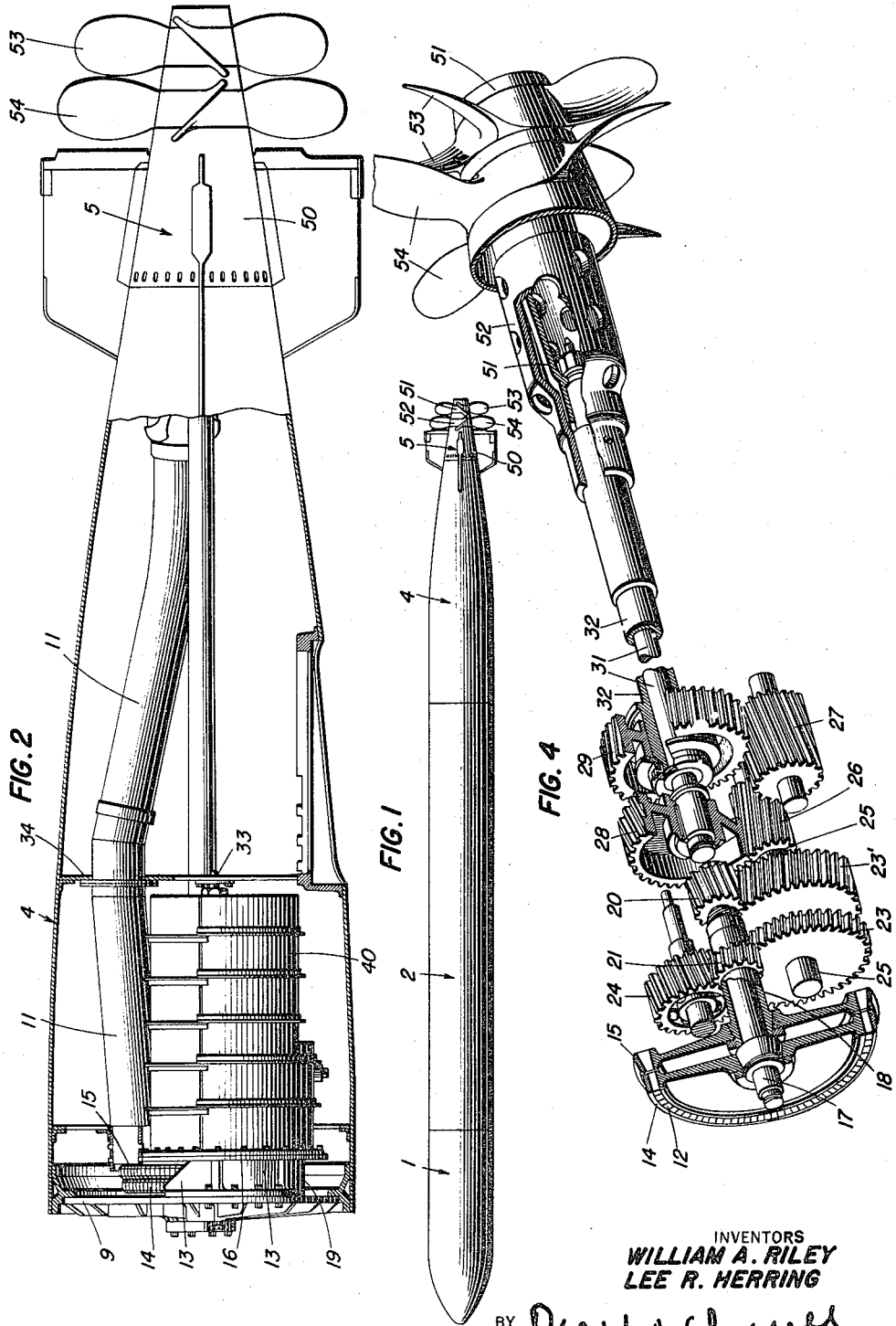
INVENTORS
WILLIAM A. RILEY
LEE R. HERRING
BY
ATTORNEY

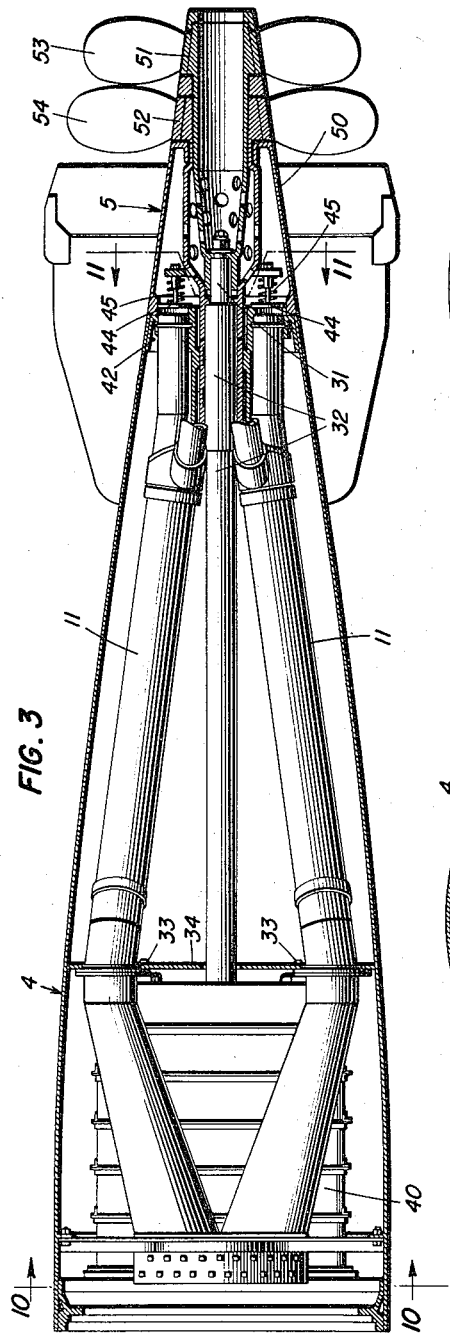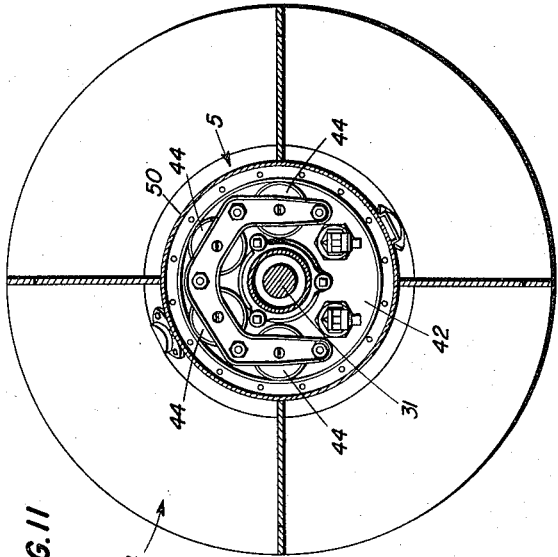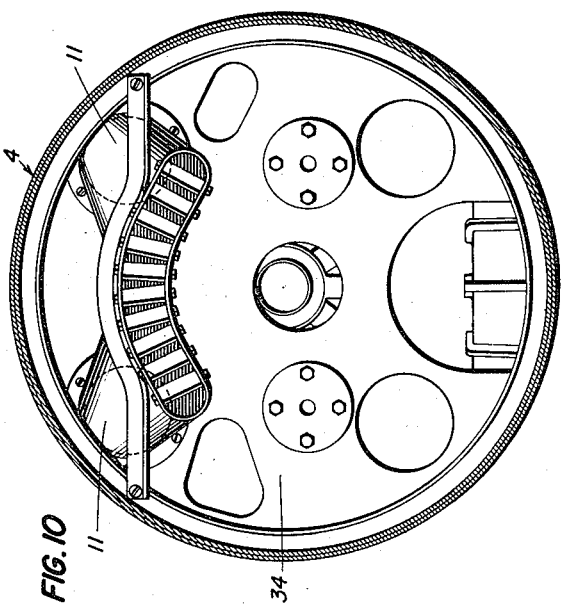

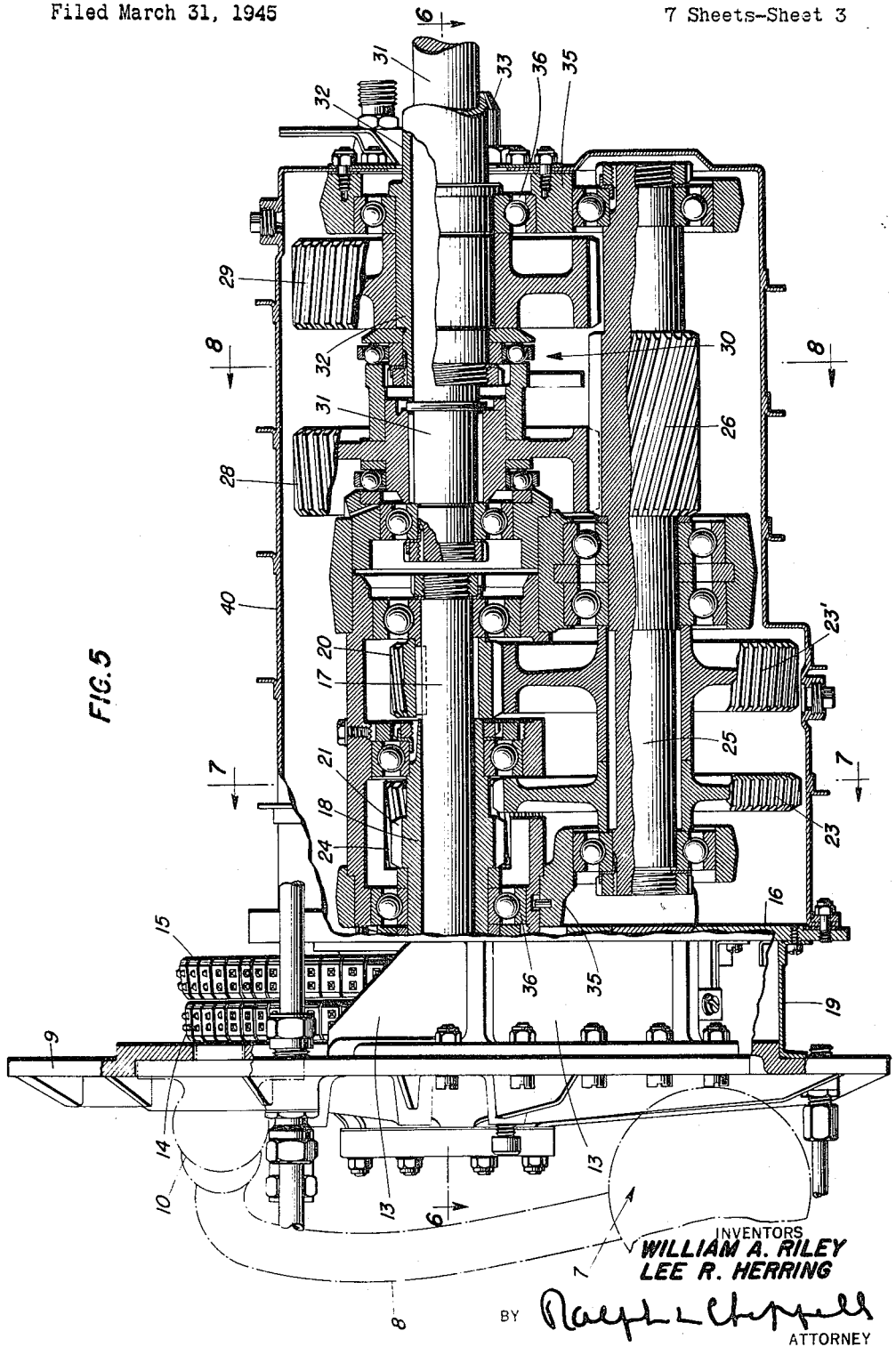

INVENTORS
WILLIAM A. RILEY
LEE R. HERRING
BY Ralph L. Chipfield
ATTORNEY

May 31, 1960  W. A. RILEY ET AL  2,938,485
POWER TRANSMISSION APPARATUS FOR TORPEDOES
Filed March 31, 1945  7 Sheets-Sheet 7

INVENTORS
WILLIAM A. RILEY
LEE R. HERRING
BY
ATTORNEY

United States Patent Office

2,938,485
Patented May 31, 1960

2,938,485

POWER TRANSMISSION APPARATUS FOR TORPEDOES

William A. Riley and Lee R. Herring, United States Navy, assignors to the United States of America as represented by the Secretary of the Navy Filed Mar. 31, 1945, Ser. No. 586,009

1 Claim. (Cl. 114—20)

(Granted under Title 35, U.S. Code (1952), sec. 266)

This invention relates to underwater torpedoes, and particularly to the construction and arrangement of the propelling machinery and related parts of such torpedoes.

An important object of the invention is to provide a torpedo incorporating a novel, improved motor-transmission system, having a turbine-type main driving motor arranged concentrically with the centerline or axis of the torpedo, and in conjunction with which we provide improved means for handling the turbine gases, in a manner to increase the overall thermal and mechanical efficiency of the system.

Another object of the invention is to provide an improved transmission construction for torpedoes, including improved supporting and housing means therefor.

Another object is to provide a torpedo motor-transmission system of very compact and rugged design, having a low center of gravity and resultantly contributing to the stability of the torpedo and its resistance to roll, and wherein turbine wheels of maximum size may be employed.

Still another object is to provide such a turbo-driving system for torpedoes so designed that the hot driving gases travel a relatively straight path from the turbine nozzles to the exhaust, back pressure being resultantly held to a minimum, the design further being such that the gases are effectively segregated at all times from the mechanical components of the transmission system, and from other elements of the torpedo whose efficiency might be impaired by the heating effect of such gases. An object related to that last stated is to provide such a turbo-drive system in which the gases pass directly through the turbine wheels, without impinging any parts of the wheels themselves other than the bucket areas to which the energy of the gases is transmitted. By virtue of the attainment of the last noted objects relating to the handling of the gases, the entire mechanical system operates at considerably lower temperatures than have heretofore been possible in torpedoes of this general class. Much closer tolerances may accordingly be employed in the design of transmission gears, turbine wheels, nozzles, and the like, without danger of seizure or friction due to expansion, and with resultant greatly increased efficiency.

Other objects and advantages will become apparent upon consideration of this disclosure in its entirety.

In the drawings:

Fig. 1 is a side elevational view of a torpedo constructed in accordance with the present invention;

Fig. 2 is a view partly in substantially vertical longitudinal section and partly in side elevation of the afterbody and tail portions of the torpedo of Fig. 1, on a larger scale;

Fig. 3 is a sectional plan view, the hull and the tail portion being shown in substantially central section, while the components of the afterbody are shown in plan;

Fig. 4 is a diagrammatic perspective view of the turbo-transmission drive system including the propellers and their drive shafts, the latter being centrall broken away;

Fig. 5 is a longitudinal vertical sectional view of the turbo-transmission assembly;

Figure 6:
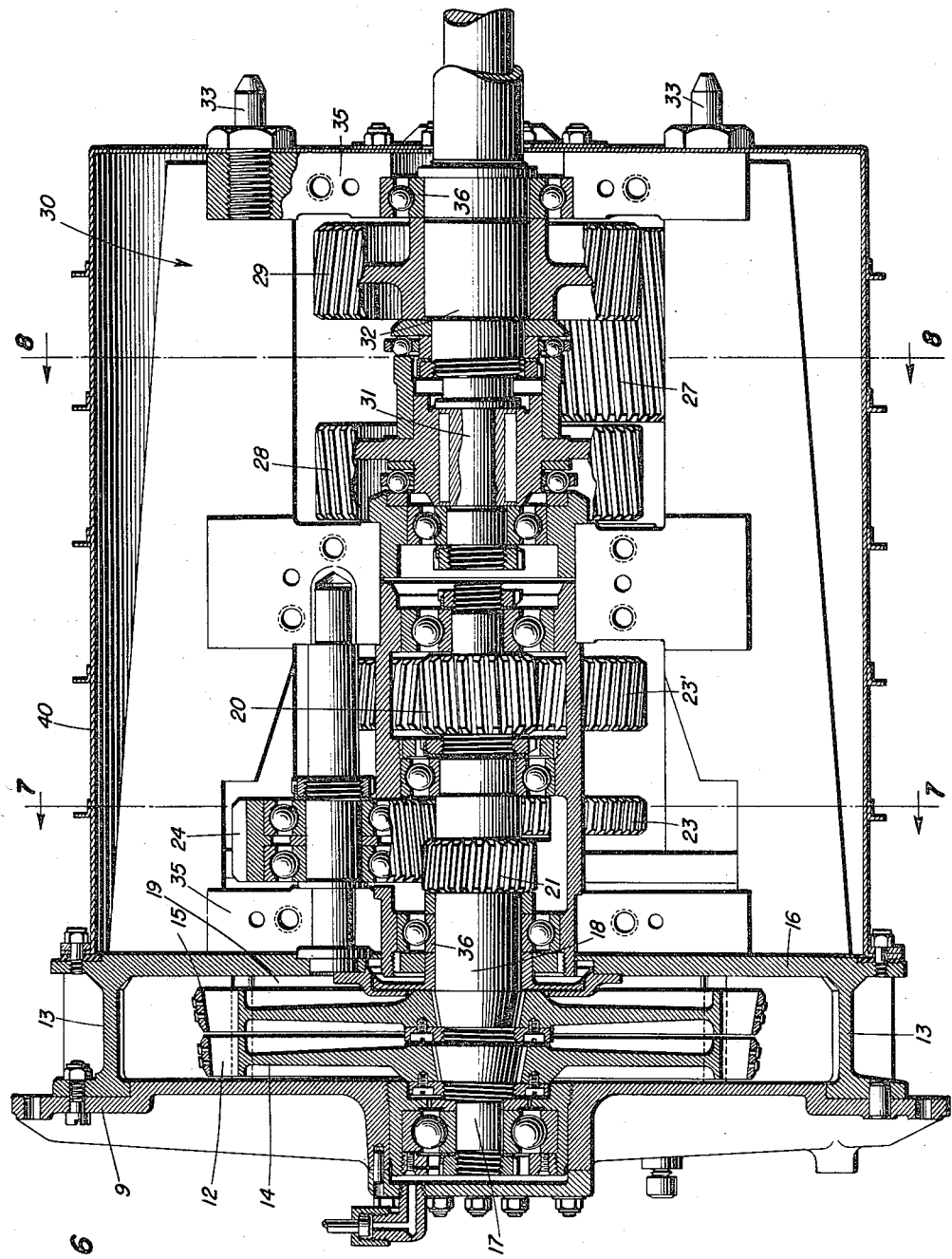
Fig. 6 is a horizontal sectional plan view of the same, taken as indicated by the line and arrows 6—6 of Fig. 5.
Figure 7:
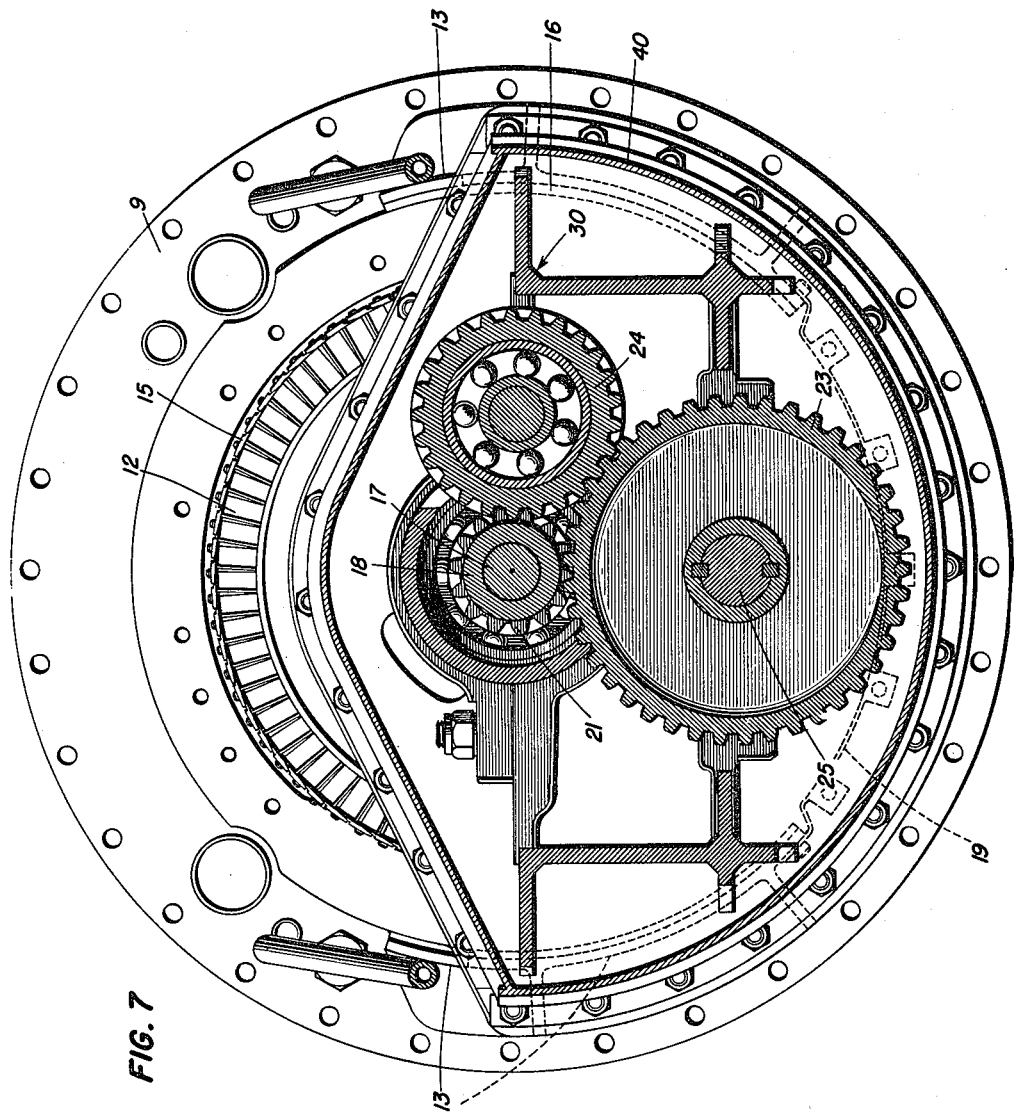
Figure 8:
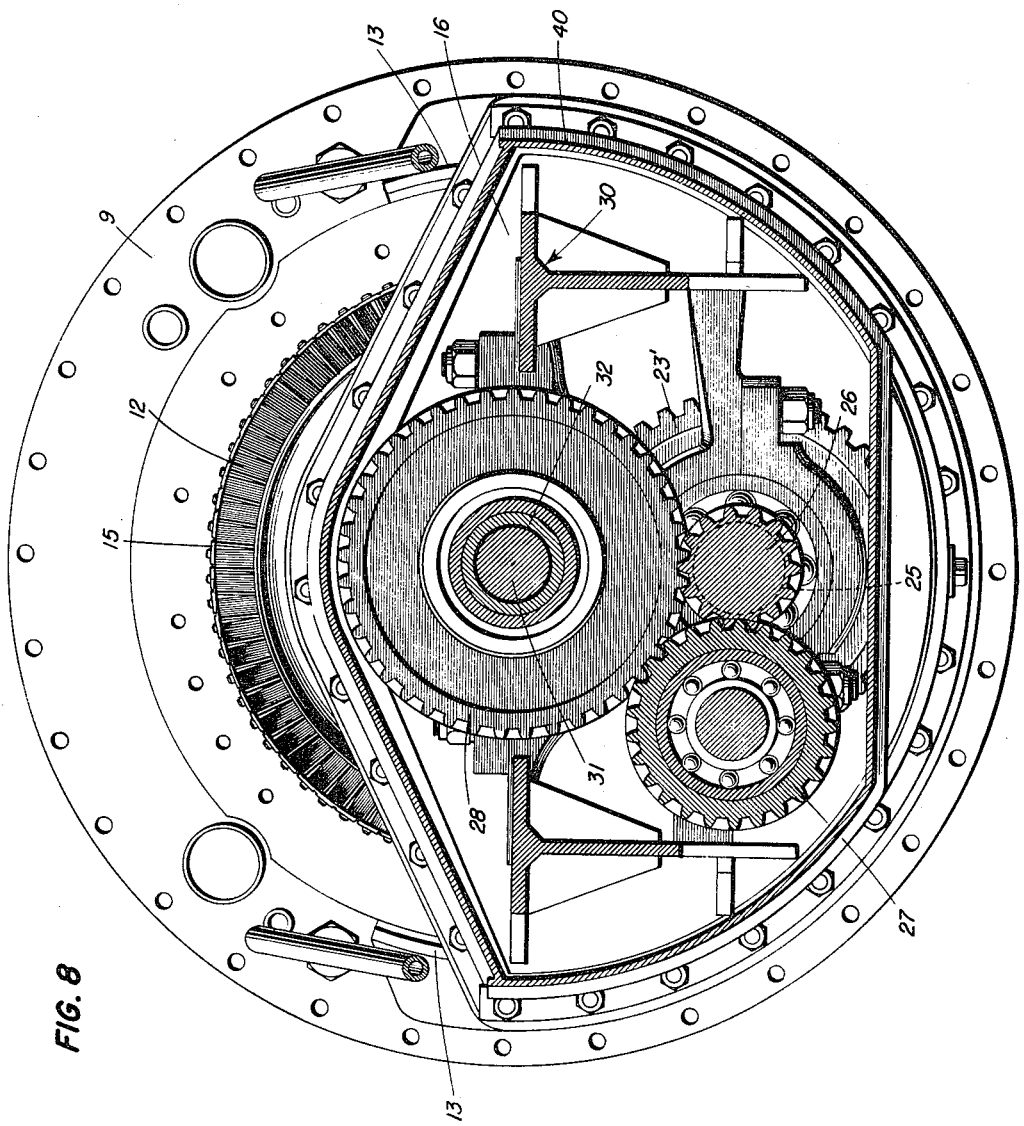
Figure 9:
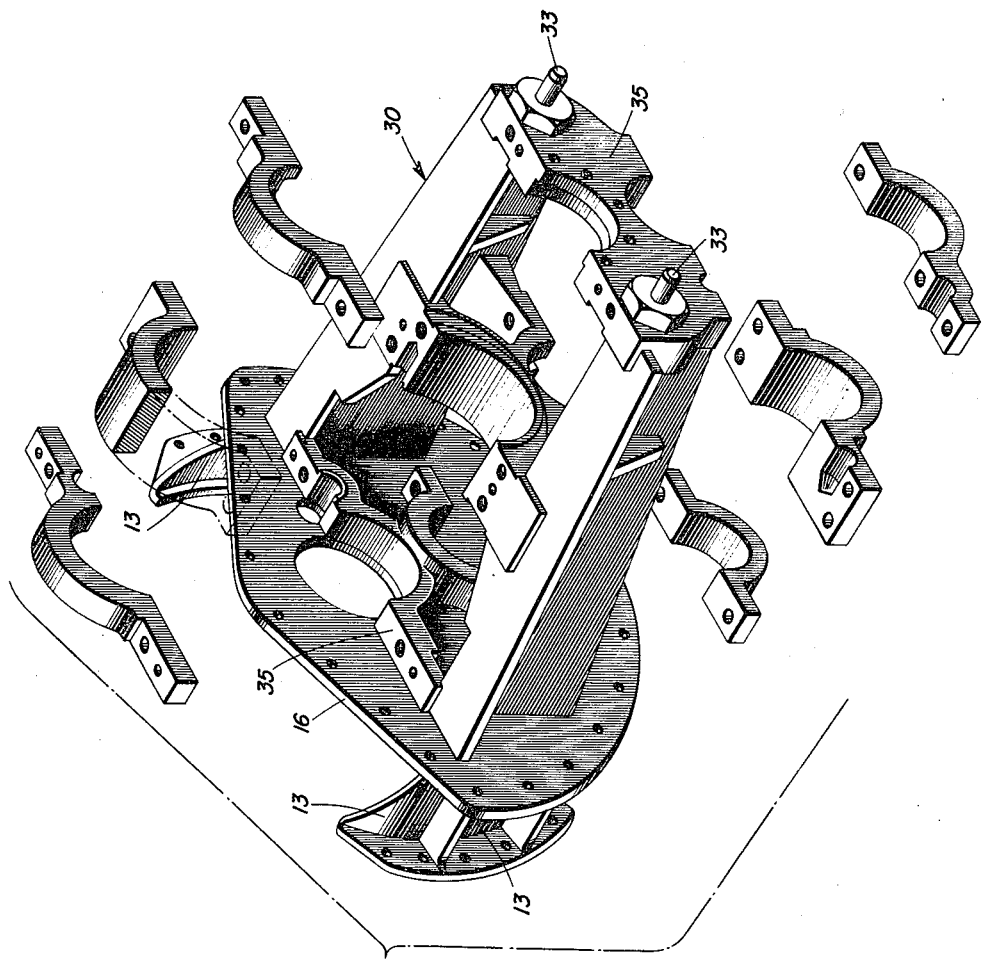

Figs. 7 and 8 are vertical sectional views taken substantially on the lines 7—7 and 8—8 respectively of Fig. 5, and looking in the direction of the arrows, the exhaust manifold being omitted;

Fig. 9 is a perspective view of the transmission frame and associated bearing caps, the latter shown detached;

Figs. 10 and 11 are vertical sectional views taken substantially on the line 10—10 and 11—11 of Fig. 3 and looking in the direction of the arrows;

Referring now to the drawings, the principal sections of the torpedo comprise the war head or explosive carrying portion 1, the flask section 2 containing the fuel and other sources of motivating gases, the afterbody 4 containing the propelling and course-controlling mechanisms, and the tail section 5 supporting the propellers, the rudders, and the shafts and actuating rods for the last-mentioned elements. The present invention is primarily concerned with the construction of the driving means, contained primarily in the afterbody. Since the details of the war head and fuel flask sections form no part of the present invention, these will not be considered in detail.

The gas-forming and combustion system preferably correspond to the disclosure of Bichowsky and Canfield application, Serial No. 100,686, filed September 14, 1936, for "Combustion Apparatus and Method." The comburent and gas forming materials, carried in the flask section 2, are delivered to the combustion flask 7 (Fig. 5), housed in a midship section which forms an extension of the flask 2 and is interposed between the flask and the afterbody. The combustion flask, secured to the forward side of the bulkhead 9, is preferably of the construction disclosed in the copending application of Robert H. Canfield filed under date of December 16, 1944, Serial No. 568,528, entitled "Combustion Flask."

The gases generated in the combustion flask are delivered through a dry pipe 8 to the nozzle assembly 10, also mounted upon the forward side of the bulkhead 9 and the discharging therethrough into the afterbody in position to impinge the bucket section 12 of the forward turbine wheel 14 near the top of that wheel. A second stage turbine wheel 15 mounted directly abaft and coaxially with the first stage wheel 14 takes the exhaust from wheel 14 and is thereby rotated in the opposite direction. It will be noted that the general direction of gas travel through both wheels is directly fore and aft and aligned with the direction of gas travel through the exhaust system, while both wheels are coaxial with the torpedo. The exhaust system includes a manifold 11, arranged to collect the gases from the after side of the wheel 15 and to conduct such gases through the midship section and to the exhaust means in the tail in a relatively straight path and without allowing the gases to directly contact and so unduly heat any of the other mechanical components. The relatively straight, non-devious character of the gas path also reduces back pressure, increasing the efficiency of the turbines, as compared with conventional arrangements in which the gases must be turned abruptly both before and after leaving the turbine buckets.

A relatively heavy transverse web 16 forms a bulkhead between the turbine and transmission sections and carries the forward end of the transmission assembly. Web 16 is supported by a pair of integral partly cylindrical ribbed flanges 13 projecting forwardly therefrom, partly enclosing the turbine wheels and having a flat forward flange bolted to the afterside of bulkhead 9. Completing the lower part of the turbine enclosure is a partly cylindrical separately removable sheet metal pan section 19, whose flanged forward rim is frictionally pressed against bulkhead 9 while its after end is secured as by screws to web 16.

The transmission and propeller shafting are also coaxial with the turbine wheels and with the hull of the torpedo, while the transmission lay shafts and idler gears are located below the main transmission shaft. This arrangement affords a much lower center of gravity than is possible in the conventional construction in which the turbine wheels are mounted horizontally in an upper portion of the hull with the transmission below them. In addition to making possible larger turbine wheels and direct rearward gas flow, as noted above, this arrangement avoids the use of bevel gears or other direction-changing means in the line of drive. The efficiency of torque transmission is thereby materially increased.

The turbine wheels are carried by telescoping shafts 17, 18 as shown, the central shaft for the forward wheel 14 carrying at its rear extremity a driving gear 20 while a corresponding driving gear 21 is mounted upon the rear extremity of the sleeve spindle 18 for the after wheel 15. A double back gear formed of two rigidly connected sections 23, 23' mounted upon a lay shaft 25 receives the power from both turbine wheels, the section 23 being driven by spindle gear 21 through an idler 24, while the section 23' is directly driven by the gear 20. This arrangement will be seen to constitute the first stage of a speed reducing train, the second stage of which comprises the after back gear 26 and idler 27, meshing with the larger gears 28, 29 fast upon the telescopic propeller shafts 31, 32 respectively. The after back gear 26 is fast upon the lay shaft 25 and thus receives the power from both turbine wheels. Gear 26 delivers a part of its torque directly to the after propeller 53 through the gear 28 and central propeller shaft 31 while the remainder of its torque drives the forward propeller 54 through the idler 27, gear 29, and tubular propeller shaft 32, the propellers being thereby rotated in opposite directions to counterbalance torque in the well known manner.

A rigid but skeletonized frame, the construction of which is best shown in Fig. 9, supports the main and lay transmission shafts, and is provided with cross webs, as 35 adapted to support the bearings as 36 for the transmission shafting. The frame assembly, generally designated 30 is open at its bottom to allow the lay shaft gears to project therefrom and into the sump of the sheet metal casing 40 which tightly encloses the entire transmission. At its forward extremity the frame 30 is attached to the web 16, with which it may be integrally cast, as shown, while the after end of the frame carries studs 33 adapted to be piloted in and supported by a transverse bulkhead 34 (Fig. 3). At its forward end the casing 40 is sealed with respect to the web 16, while the after end of the casing extends inwardly to a point close to the transmission shaft, thereby forming an effective oil receptacle and permitting splash lubrication of the transmission.

As best shown in Fig. 3, the manifold is divided into two symmetrical sections, the gases being conducted rearwardly therethrough, to the afterbody rear bulkhead 42 which carries exhaust valves 44 adapted to be opened by the pressure of the exhaust gases and normally maintained closed by the springs 45. Within the tail cone 50 an arrangement of parts is employed which will be recognized as conventional. The continuations 51, 52 of the shafts 31, 32 respectively are expanded and constructed in the form of perforated cages or sleeves upon the projecting after ends of which the propellers are mounted. The inner sleeve opens rearwardly through the hub of the after propeller 53. The gases are thus forced into the tail cone, thence through the cages or sleeves 51, 52 and out through the propeller hubs.

The invention herein described may be manufactured and used by or for the Government of the United States of America for governmental purposes without the payment of any royalties thereon or therefor.

We claim:

In power transmission apparatus, a prime mover consisting of a coaxial and oppositely rotatable pair of turbine wheels, closely spaced forward and aft bulkheads contiguous to the respective turbine wheels, said bulkheads having a bridging between them, producing an enclosure around the major periphery of said wheels excepting a minor portion and confining them to a narrow chamber, oppositely rotatable telescopic turbine wheel shafting to the components of which the respective wheels are affixed, a single lay shaft underlying the axis of the shafting, gearing by which the lay shaft is driven by the turbine wheels and by which their opposite rotations are resolved into unidirectional rotation of the lay shaft, terminal telescopic shafting gearing by which the driving power of the lay shaft is delivered to the terminal shafting and by which its unidirectional rotation is divided into opposite rotations of the components of said shafting, bearings for the turbine and terminal shafting, the respective ones of a pair of the turbine shafting bearings being situated immediately fore and aft of the turbine wheels and outside of their enclosure, and an exhaust manifold connected to the aft bulkhead at said minor portion of the narrow turbine wheel chamber, said manifold including symmetrically shaped sections overlying the axis of the terminal and turbine shafting and leading to the end of the terminal shafting.

References Cited in the file of this patent

UNITED STATES PATENTS

| | | |
|---|---|---|
| 858,266 | Davison | June 25, 1907 |
| 1,610,661 | Currier | Dec. 14, 1926 |
| 1,983,392 | Nilsson | Dec. 4, 1934 |
| 2,269,030 | Lysholm | Jan. 6, 1942 |

FOREIGN PATENTS

| | | |
|---|---|---|
| 316,293 | Great Britain | Sept. 17, 1930 |